United States Patent Office 2,768,529
Patented Oct. 30, 1956

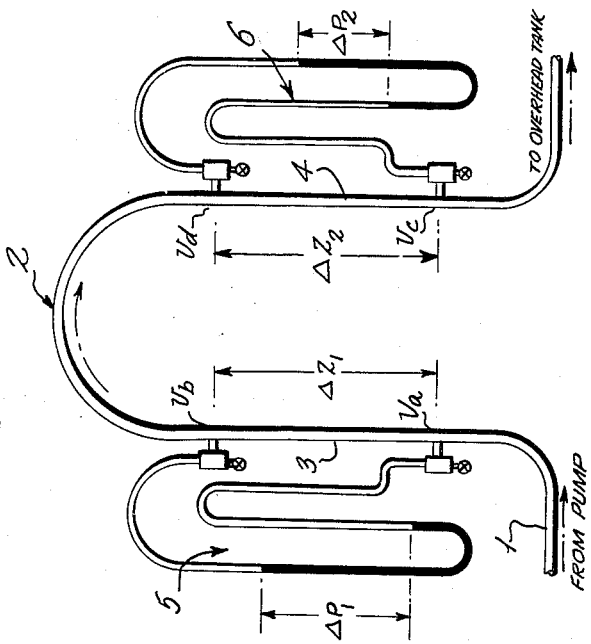
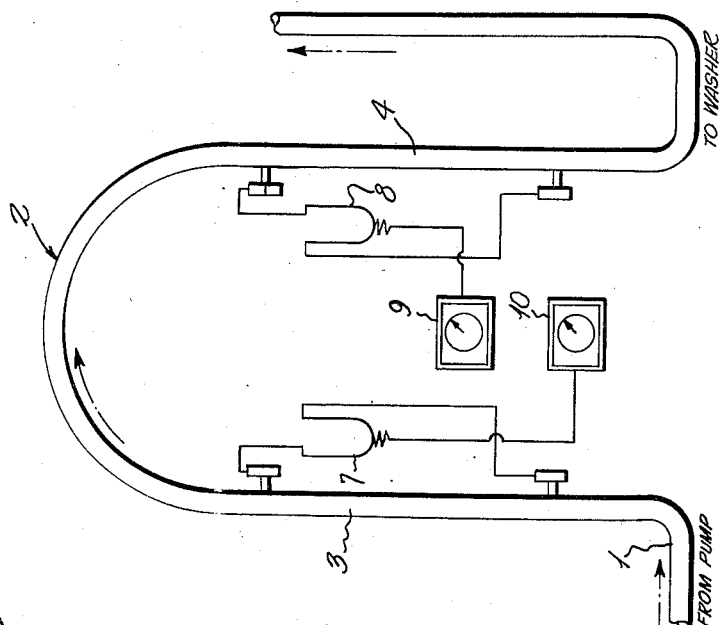

2,768,529

MEANS FOR DETERMINING SPECIFIC GRAVITY OF FLUIDS AND SLURRIES IN MOTION

Thomas Waterman Hagler, Sr., Augusta, Ga., assignor to Georgia Iron Works Co., Augusta, Ga., a corporation of Georgia Application June 23, 1954, Serial No. 438,844

3 Claims. (Cl. 73—438)

This invention relates to devices for determining the specific gravity of fluids and slurries flowing in pipes and conduits.

There are many processes in industry where it is imperative that the specific gravity of a fluid or slurry be known at all times so that apparatus may be set to operate at peak efficiency. An example would be a process which is carried out through the use of a liquid cyclone separator, where the cone discharge must be varied in accordance with the specific gravity of the material being processed. There are devices now in use which control the discharge in accordance with the material in the cyclone, but these devices will not give full efficiency, as the cyclone should be adjusted prior to the entry of the slurry into the cyclone. There are also many devices for obtaining specific gravity, but where these are used with fluids in motion they are inaccurate and non-responsive to minor variations, due to such factors as velocity, friction losses, static head, etc. If a cyclone is adjusted in accordance with the readings of such instruments optimum results cannot be obtained. Another field in which it is important to know at all times the specific gravity of material is that of hydraulic mining. The specific gravity indicates the rate of mining and washing and flotation activity can be governed accordingly.

The principal object of the present invention is to provide a device for determining the specific gravity of fluids or slurries in motion in a pipe or conduit, by means wherein a differential pressure registration will be the direct function of the specific gravity of the material unaffected by velocity, friction losses and static head.

A more specific object of the invention is to provide a device which will measure the static heads of two equal legs of a conduit or pipe, while eliminating friction loss and other losses as factors; comparing the static heads with a calibrated static head when water is the measured medium; and using the variation found as a means of reading specific gravity.

A still further object of the invention is to provide such a device having means for controlling processing equipment in accordance with changes in specific gravity in the material being processed.

Other objects of the invention will become apparent from the following description of practical embodiments thereof when taken in conjunction with the drawings which accompany, and form part of, this specification.

In the drawings:

Figure 1 is a diagrammatic view of a device, embodying the principles of the present invention, from which visual readings may be obtained for determining specific gravity; and, Figure 2 is a diagrammatic view of a similar device from which visual readings may be obtained, and which includes means for automatically controlling processing equipment in accordance with specific gravity changes.

It has been found that continuity equations for fluids in motion containing the quantity "specific weight" (a function of specific gravity) can be solved and this quantity found, provided velocity head and static head are known, or can be made to cancel out of the equation. In writing the equation stated above with the provision that velocity head and friction head must cancel out we have:

$$\frac{\Delta P_1}{W} = hf_1 + \Delta Z_1 + \frac{Va^2 - Vb^2}{Zg}$$

$$\frac{\Delta P_2}{W} = hf_2 + \Delta Z_2 + \frac{Vc^2 - Vd^2}{Zg}$$

When:

$\Delta P_1$ and $\Delta P_2$ = difference in pressure lb./sq. ft.
$hf_1$ and $hf_2$ = friction loss
$\Delta Z_1$ and $\Delta Z_2$ = difference in elevation
$Va$, $Vb$, $Vc$, and $Vd$ = velocity
$W$ = specific weight lb./cu. ft.
$\Delta h_1 wa$ and $\Delta h_2 wa$ = the weight of water in ascending and descending legs of equal length in a conduit.

Assuming:

$hf_1 = hf_2$ and $hf_2$ is considered negative and $$\Delta Z_1 = \Delta Z_2$$

also all points in pipe ($a$ to $d$) have the same cross section area therefore:

$$Va = Vb = Vc = Vd$$

then:

$$\frac{\Delta P1}{W} = hf_1 + \Delta Z_1 + \frac{Va^2 - Vb^2}{2g}$$

$$\frac{\Delta P2}{W} = -hf_2 + \Delta Z_2 + \frac{Vc^2 - Vd^2}{2g}$$

substituting and solving we have:

$$\Delta P_1 + \Delta P_2 = W(\Delta Z_1 + \Delta Z_2)$$

$$\text{Sp. g.} = \frac{W}{62.5}$$

$$W = 62.5 \text{ sp. g.}$$

Substituting:

$$\text{Sp. g.} = \frac{\Delta P1 + \Delta P2}{62.5(\Delta Z_1 + \Delta Z_2)}$$

but:

$$\frac{\Delta P_1 + \Delta P_2}{62.5} = \text{ft. water} = \Delta h_{1wa} + \Delta h_{2wa}$$

Therefore:

$$\text{Sp. g.} = \frac{\Delta h_{1wa} + \Delta h_{2wa}}{2\Delta Z}$$

The problem then was to provide a device in which velocity head and friction head could be disregarded so that specific gravity would be a direct function of the pressure differential.

Referring to the drawings it will be seen that a pipe or conduit 1, for carrying fluid or slurry from a source of supply to a tank or processing equipment, is provided with a vertical inverted U-shaped bend 2 having the vertical legs 3 and 4. Manometers 5 and 6 have tapped connections to the legs spanning equal lengths thereof, with the respective connections being at equal elevations. Although manometers have been shown on the drawings, it will be understood that other pressure-sensitive devices may be used.

By reason of this arrangement, the static heads will be equal, velocity will be equal at all points, and friction losses can be discounted as they will cancel out or be offset in the two legs of the U-bend.

In Figure 2, a similar arrangement is shown, but range tubes 7 and 8, or similar devices which will be responsive to pressure changes, are used to operate electric recorders 9 and 10 which will indicate pressure changes from which specific gravity may be determined. The electrical impulses from the range tubes may be used to control the flow of slurries in pipes, or to vessels or processing equipment where the specific gravity of the material is of importance in the process.

In calibrating the manometers, or gauges, water may be used in known quantity, and a dry ingredient progressively added in small quantities to establish readings for known specific gravities.

Due to the fact that a U-bend is provided in the pipe or conduit, and pressure-sensitive gauges are located at equal elevation in the legs of the U, velocity, friction losses and static head will have no effect upon the differential readings of the gauges. The gauge readings will be directly responsive to the specific weight of the material in the pipe or conduit. In the leg of the U in which the flow of the material is upward, the pressure will be pump pressure as counteracted by gravity, and in the leg having downward flow pump pressure assisted by gravity. This will give a differential reading from which the specific gravity of the material can be determined.

It will be understood that the present disclosure is directed to the broad principle of measuring pressures in two legs of equal length in a vertical, inverted U-bend in a pipe or conduit through which fluids or slurries are flowing, and that the means for carrying out the principle are disclosed only diagrammatically. Many other means may be used within the scope of the invention as defined in the appended claims.

What is claimed is:

1. Means for determining the specific gravity of fluids and slurries in motion in a conduit comprising, an inverted, vertical U-bend formed as a part of the conduit of uniform cross-section throughout with the vertical legs of the U being of equal length, each leg having two vertically spaced apart pressure taps, with the taps in one leg being in the same horizontal planes as the corresponding taps in the other leg and a differential pressure sensitive device for each leg connected across the pressure taps of the leg with which it is associated.

2. In means for determining the specific gravity of fluids and slurries in motion in a conduit as claimed in claim 1, said pressure-sensitive devices being manometers.

3. In means for determining the specific gravity of fluid and slurries in motion in a conduit as claimed in claim 1, said pressure-sensitive devices being range tubes.

References Cited in the file of this patent
UNITED STATES PATENTS

| | | |
|---|---|---|
| 1,697,867 | Haultain | Jan. 8, 1929 |
| 1,761,295 | Greenfield | June 3, 1930 |
| 2,115,520 | Decker | Apr. 26, 1938 |
| 2,287,027 | Cummins Jr. | June 23, 1942 |